April 20, 1965 N. O. YORDI 3,179,308
DISPLACEMENT TYPE METERING DEVICE
Filed Jan. 7, 1963

INVENTOR
Norman O. Yordi

BY Mason, Fenwick & Lawrence
ATTORNEYS

United States Patent Office 3,179,308
Patented Apr. 20, 1965

3,179,308
DISPLACEMENT TYPE METERING DEVICE
Norman O. Yordi, Rte. 1, Box 25, Ardmore, Okla.
Filed Jan. 7, 1963, Ser. No. 249,749
10 Claims. (Cl. 222—368)

This invention relates to a power driven displacement device for the intermittent dispensing of liquids.

One of the objects of the invention is the provision of a device of the type described, the functioning of which is not affected by reversal in the direction in which it is driven.

Another object of the invention is to provide a displacement device that automatically regulates the frequency of the dispensing phases of its operating cycle, and therefore the rate of output, in direct ratio to the speed of the driving element of the apparatus which it serves, or by which it is driven.

A further object of the invention is the provision of a metering device providing a closely metered amount of liquid when needed, the amount being increased or decreased with the rate of movement of the machine or other apparatus by which it is driven, and the beginning and cessation of flow being immediate when the driving apparatus starts and stops.

Other objects of the invention will appear as the following description of a practical embodiment thereof proceeds.

In the drawing which accompanies and forms a part of the specification and which shows a specific embodiment of the invention in which the metering device has a servo-relationship to the apparatus that drives it, being a lubricator for a chain belonging to the apparatus.

Figure 1:
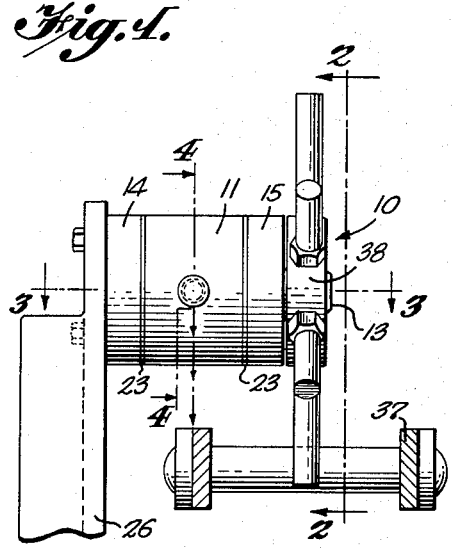
FIGURE 1 is a side elevational view, partly in section, of the metering device shown secured to a fixed element and driven by a chain.
Figure 2:
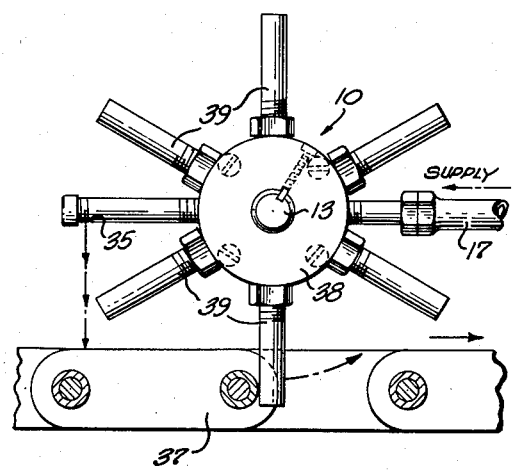
FIGURE 2 is an end sectional view taken along the line 2—2 of FIGURE 1.

The drawing is a full scale illustration of a prototype model, a size suitable to serve a chain conveyor, it being understood that size and dimensions are immaterial in the determination of patentability.

Referring now in detail to the several figures of the drawing, in which the same reference characters have been consistently used to denote identical parts, the numeral 10 represents the device as a whole, comprising the hollow cylindrical casing 11, the rotor 12 having the drive shaft 13 at one end, the end plates 14 and 15, the latter being formed with the bearing aperture 16 through which the shaft 13 extends, the supply pipe 17 providing liquid under pressure, in this example lubricant, and the discharge pipe 18 which contains the plunger 19, the latter being one of the vital instrumentalities in the functioning of the device.

The rotor 12 is provided, in an intermediate zone, with a circumferential groove 20, the bottom of which is in a chordal plane with respect to the circumferential face of the rotor.

The casing 11 surrounds the rotor coaxially thereof with clearance between the adjacent curvilinear faces of said members, the rotor being longer than the casing and projecting therefrom at both ends. The end plates 14 and 15 are formed with shallow coaxial recesses 22 into which the projecting ends of the rotor rotatably fit, there being annular gaskets 23 between the ends of the casing and the end plates, surrounding the extended ends of the rotor. The end plate 15 is formed about the inner end of the bearing aperture, with an annular seat for an O-ring 21 that seals the device from leakage around the interfacial joint between the bearing and shaft. Tight joints are maintained between the respective end plates and the rotor by the screws 24 on the one hand, and the bolts 25 on the other, which do double duty by also securing the metering device to the fixed element 26 of the apparatus.

The supply and discharge pipes 17 and 18 communicate with the inside of the casing through the openings 27 and 28 in the inner wall of the casing, which are coaxial, located at diametrically opposite points and which register with the groove 20 in the course of rotation of the rotor.

The openings 27 and 28 are surrounded by restricted areas of the inner wall of the casing, each being bounded by a continuous channel consisting of spaced transverse limbs 29 parallel to the axis of the rotor and spaced circumferential limbs 30, the corners at the junctures of the limbs being rounded. The respective channels function as a seat for O-rings 31 and 32. O-rings are customarily circular, but in this instance they are stretched and made to conform to the shape of the channel in which they are seated. A small part of the height of the O-rings 31 and 32 is in high relief with respect to the interior surface of the casing wall, making with the wall of the rotor a liquid tight seal about the perimeter of the restricted areas.

While the present application describes, for simplicity, a rotor having a single metering groove, the same rotor may be employed in larger capacity devices by providing additional grooves in side by side parallel relation to the one shown. The substantial channels and O-rings have been designed with this in mind, affording longitudinal spread of the seal to accommodate the plurality of grooves.

Figure 3:
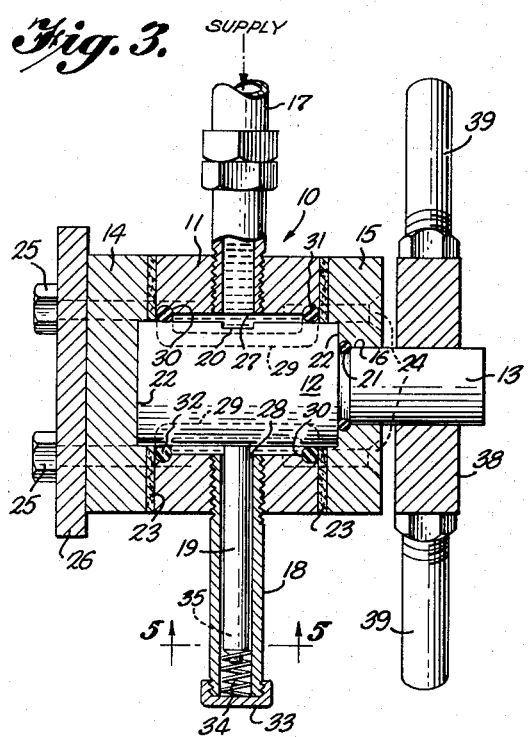
FIGURE 3 is a cross section taken along the line 3—3 of FIGURE 1.
Figure 4:
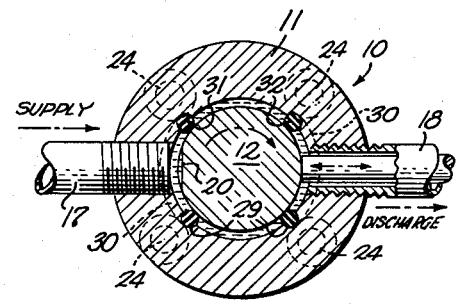
FIGURE 4 is a cross section taken along the line 4—4 of FIGURE 1.
Figure 5:
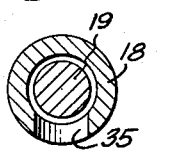
FIGURE 5 is a cross section taken along the line 5—5 of FIGURE 3.

FIGURES 3, 4, and 5 show the cylindrical plunger 19, loosely received in the discharge pipe, the clearance being quite appreciable, so that it is possible for it to assume a canted position in said pipe. Since the function of the plunger is to enter the groove 20 each time said groove is brought to the foot of the plunger by rotation of the rotor, and displace at least a part of its liquid content, the groove must be wide enough to receive the lower end of the plunger in any position of cant. The groove is therefore wider than the plunger.

The end of the discharge pipe is closed by a cap 33 which forms an abutment for one end of a spiral spring 34, the opposite end of which surrounds a reduced tit on the outer end of the shoulder by which it is held in place. The tit defines a shoulder at its base, affording a seat for the end of the spring, the latter being held under sufficient compression to assure continuous contact of the inner end of the plunger with the surface of the rotor including the flat bottom of the groove 20, notwithstanding the possibility of viscous friction of liquid in the clearance space between the plunger and discharge pipe resisting the inward return of the plunger. The discharge pipe is provided adjacent its outer end with a lateral discharge opening 35.

Figure 6:
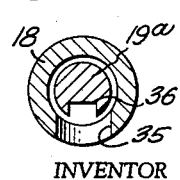
FIGURE 6 is a view in cross section through the discharge pipe showing a modified form of plunger.

The plunger may be a solid rod, as shown in FIGURES 3, 4, and 5, or if the discharge tube is long and the liquid very viscous, a relatively closely fit plunger having a channel running its length from pickup end to discharge opening, as suggested by the cross sectional view of the alternative plunger 19a, as shown in FIGURE 6, in which the plunger has a free sliding fit within the pipe 18, and a longitudinal groove 36 forming the liquid conduit. In the case of very viscous liquids, very little will pass between the circumferential faces of the pipe and plunger, the total friction being thus reduced.

In the normal operation of my metering dispensing device, the entire clearance space between the rotor and casing is completely full of liquid. That portion of the space enclosed by the O-ring 31 is in communication with the supply pipe and the liquid therein is normally under the pressure of the supply. The liquid in the space within the O-ring 32 is in communication with the discharge pipe which is open to atmosphere, the liquid in said space being held in position by the air pressure at the end of the discharge pipe, the same as water is held in place in a full, inverted, open bottle.

In operation, the turning of the rotor shifts the open-ended groove circumferentially from a position wholly within the O-ring 32. In traversing this arc, the groove first passes beneath the O-ring 31 establishing a passage through which the pressure of the supply liquid is transmitted to the space outside the O-ring 31. If there were no O-ring 32, this would result in the direct discharge of an unmetered quantity of liquid through the groove, over the face of the rotor to the discharge pipe, continuing so long as the groove remained under the O-ring. However, since while the groove is beneath the O-ring 31, the seal of the O-ring 32 remains intact, and there is no through flow to the discharge pipe.

In its travel from the supply pipe to its position within the O-ring 32, the groove 20 does not necessarily carry any liquid with it, but being completely submerged at all times, it is full of liquid when it reaches the point at which it encounters the plunger 19, at the inner end of the discharge pipe. As the rotor turns, the plunger is in the path of travel of the groove and making wiping contact with the surface of the rotor under the urge of the spring 34. When the groove meets the plunger, the latter enters the groove, which is wider than the plunger, sliding along the flat bottom of the groove with yielding pressure and displacing liquid therefrom in a volume equal to that of the submerged portion of the plunger at its point of deepest submergence. The displaced liquid may flow past both sides of the plunger within the groove, but since the space within the O-ring 32 including the groove is already full, the displaced volume has nowhere to go except to join its bulk to the surrounding body of liquid, causing an equal volume to be displaced into the discharge pipe.

The O-rings function to maintain three graded pressure zones, the relatively high pressure zone about the supply pipe, a zone of somewhat lower pressure—the space between the O-rings, and the atmospheric pressure zone, the space within the O-ring 32, wherein the liquid is held by atmospheric pressure assisted by the surface tension of that part of the surface of the liquid that bridges the relatively small opening at the inner end of the discharge pipe.

It is in this last mentioned zone that the liquid filled system loses liquid through displacement by the plunger. When the seals of the O-rings are successively broken by the passage beneath them of the groove on the return phase of the rotor, pressure in the intermediate zone returns make-up liquid to the low pressure zone, and in the same manner, pressure in the supply zone returns make-up liquid to the intermediate zone.

In the illustrated embodiment of the invention, a specific driving means for the rotor is shown tailored to fit its particular use in the apparatus with which it is associated. It is to be understood that this is not intended as any limitation of the invention, since the latter is adapted to be operated by any driving means whatsoever, and is not necessarily driven by apparatus with which it is associated, or by apparatus that utilizes the liquid.

As shown, the metering and dispensing device is secured to a fixed part of the apparatus structure, with the discharge pipe 18 overhanging a chain 37 in a position to drop metered charges or slugs of lubricant upon the moving linkage. The driving connection is a hub 38 on the drive shaft, having radially disposed cogs 39 that mesh with the linkage. It is obvious that when the chain starts, the metering device at once begins to operate, and when it stops, the flow of lubricant is immediately discontinued. From the previous description it is apparent that the rate of delivery is proportional to the speed at which the apparatus is driven, which, in general, is the measure of the need for lubrication. It is self-evident that no close tolerances are required in the manufacture and assemblage of this device, so it can be made inexpensively and without sacrifice of efficiency.

While I have in the above description disclosed a practical embodiment of the invention, it is to be understood that the specific construction and arrangement of the parts is by way of example and not to be construed as necessarily limiting the scope of the invention.

I claim:

1. Device for metering and dispensing liquids, comprising a casing and a driven rotor therein, having correlated cylindrical faces coaxial with the axis of rotation of said rotor, defining between them an appreciable clearance space for the passage of liquid, said casing and rotor being constructed and arranged to prevent endwise leakage from said clearance space, inlet and discharge pipes opening into the cylindrical face of said casing at opposite points forming with said clearance space a conduit for conducting liquid under pressure from a source of such liquid through said discharge pipe, circuitous sealing means seated in the cylindrical face of said casing and sealingly engaging the corresponding face of said rotor, said sealing means respectively enclosing areas of said clearance space surrounding said inlet and discharge pipes, the cylindrical face of said rotor being formed with a groove extending circumferentially partially and opening at both ends in said face, being positioned in a path of rotation that intersects said enclosed areas, and a plunger mounted in said casing having its inner end resiliently bearing upon the cylindrical face of said rotor within the enclosed area about said discharge pipe and positioned in the path of traverse of said groove, whereby to displace a volume of liquid from said groove equal to that of its submerged end while the groove is wholly within the enclosed area about the discharge pipe, thereby displacing an equal volume into said discharge pipe.

2. Device for metering and dispensing liquids as claimed in claim 1, the groove being segment shaped.

3. Device for metering and dispensing liquids as claimed in claim 1, the circuitous sealing means being O-rings.

4. Device for metering and dispersing liquids as claimed in claim 1, the circuitous sealing means being of O-cross section and of right parallelogram shape with opposite sides parallel to the axis of the rotor.

5. Device for metering and dispensing liquids as claimed in claim 1, for plunger being mounted in the discharge pipe.

6. Device for metering and dispensing liquids as claimed in claim 1, said plunger being mounted in the discharge pipe and being a loose fit therein, and said groove being sufficiently wider than the plunger to engulf the submerged end of the plunger when metering the same, regardless of the position of cant of the plunger.

7. Device for metering and dispensing liquids comprising a casing and a rotor therein, having correlated cylindrical faces coaxial with the axis of rotation of said rotor, defining between them an appreciable clearance space for the passage of liquid, said rotor having cylindrical ends and a drive shaft extending from one end, end plates for said casing formed with recesses in their inner faces fittably receiving the ends of the rotor, one of said plates having an aperture through which the drive shaft extends, said end plates being sealingly secured to said casing and means for sealing the rotary joint between the apertured plate and drive shaft, whereby endwise leakage of liquid from said clearance space is inhibited, inlet and discharge pipes opening into the cylindrical face of the casing at diametrically opposite points forming with the clearance space a conduit for conducting liquid under pressure from a source of such liquid through said discharge pipe, circuitous sealing means seated in the cylindrical face of said casing and sealingly engaging the corresponding face of said rotor, said sealing means being symmetrical with respect to the inner ends of said pipes and respectively enclosing substantial areas of said clearance space surrounding said pipes, the cylindrical face of said motor being formed with a segment shaped groove extending circumferentially partially, being positioned substantially in a path of rotation that lies in a diametrical plane passing through the centers of said inner ends, and a plunger mounted in the discharge pipe constructed to bear resiliently upon the cylindrical face of said rotor in the path of rotation of said groove to traverse the latter when it is wholly within the enclosed area about the discharge pipe whereby to displace a volume of liquid from said groove into said discharge pipe equal to the volume of its submerged end.

8. Device for metering and dispensing liquids as claimed in claim 7, the sealing means being O-rings.

9. Device for metering and dispensing liquids as claimed in claim 7, the groove being wider than the corresponding dimension of the inner end portion of the plunger.

10. Device for metering and dispensing liquids comprising a casing and a rotor therefor having complementary, coaxial, slightly spaced cylindrical faces forming a liquid conduit sealed from endwise leakage, inlet and discharge conduits in said casing communicating through openings in said casing with said space at diametrically opposite points and forming therewith a passage for liquid admitted under pressure to said inlet conduit, spaced sealing means mounted in the cylindrical face of said casing engaging the corresponding face of said rotor, respectively adjacent the openings of communication of said conduits with said space, enclosing an area about each of said openings normally sealed with respect to the intermediate portion of said space, the cylindrical face of said rotor being formed with an open-ended partially circumferential groove positioned in a diametrical plane that intersects said openings, the groove, in the course of rotation of said rotor passing successively beneath said sealing means interrupting the seal of only one at a time, and a plunger mounted in the discharge conduit, of such size as to obstruct only part of its bore, constructed to bear upon the cylindrical face of said rotor in the path of rotation of said groove to traverse the latter when it is wholly within the enclosed area about the discharge conduit, whereby to displace a volume of liquid from said groove into said discharge conduit equal to the volume of its submerged end.

References Cited by the Examiner

UNITED STATES PATENTS

| 2,974,604 | 3/61 | Pierce | 103—123 |
| 3,079,867 | 3/63 | Thomas | 103—123 |

LOUIS J. DEMBO, *Primary Examiner.*